(12) United States Patent
Lundquist et al.

(10) Patent No.: US 8,287,729 B2
(45) Date of Patent: *Oct. 16, 2012

(54) FIELD WATER PURIFICATION SYSTEM

(75) Inventors: Trygrve J Lundquist, San Luis Obispo, CA (US); Patricia M. Compas, San Luis Obispo, CA (US)

(73) Assignee: California Polytechnic Corporation, San Luis Obispo, CA (US)

( * ) Notice: Subject to any disclaimer, the term of this patent is extended or adjusted under 35 U.S.C. 154(b) by 617 days.

This patent is subject to a terminal disclaimer.

(21) Appl. No.: 12/418,598

(22) Filed: Apr. 5, 2009

(65) Prior Publication Data

US 2010/0025339 A1 Feb. 4, 2010

Related U.S. Application Data

(63) Continuation-in-part of application No. 12/111,130, filed on Apr. 28, 2008, now Pat. No. 7,514,006.

(51) Int. Cl.
| | |
|---|---|
| B01D 43/00 | (2006.01) |
| B01D 33/70 | (2006.01) |
| B01D 35/00 | (2006.01) |
| B01D 24/00 | (2006.01) |
| B01D 21/26 | (2006.01) |
| B01D 27/00 | (2006.01) |
| B01D 35/28 | (2006.01) |
| B01D 29/60 | (2006.01) |
| C02F 1/00 | (2006.01) |
| C02F 9/00 | (2006.01) |
| B01D 21/00 | (2006.01) |
| B01D 24/48 | (2006.01) |
| B01D 21/18 | (2006.01) |
| B01D 33/58 | (2006.01) |
| C02F 1/68 | (2006.01) |

(52) U.S. Cl. ...... 210/207; 210/206; 210/305; 210/257.1; 210/445; 210/407; 210/764; 210/738; 210/804; 210/470

(58) Field of Classification Search .................. 210/202, 210/207, 208, 238, 257.1, 259, 260, 305, 210/312, 445, 694, 723, 738, 804, 663, 533, 210/780, 749, 501, 407, 536, 94, 206, 764, 210/470

See application file for complete search history.

(56) References Cited

U.S. PATENT DOCUMENTS 4,031,006 A 6/1977 Ramirez
(Continued)

FOREIGN PATENT DOCUMENTS

EP 1106075 A2 * 6/2001

OTHER PUBLICATIONS

John Bratby, Coagulation and Flocculation in Water and Wastewater Treatment, Published 2006, IWA Publishing Water 407 pages, ISBN:1843391066.

(Continued)

*Primary Examiner* — Christopher Upton
*Assistant Examiner* — Nader Hossaini
(74) *Attorney, Agent, or Firm* — Martine Penilla Group, LLP

(57) ABSTRACT

A lightweight water treatment system which can be easily distributed and employed by disaster survivors for treating locally available freshwater sources. The water treatment system includes an internal storage volume for maintaining a predetermined volume of water, a water fill port in communication with the internal storage volume provided at a first end of the elongated container for receiving the predetermined volume of water, a sealing member disposed at about the first end of the elongated container for maintaining the volume of water within the internal storage volume, a second end of the elongated container for receiving sediment settling out of the predetermined volume of water and a discharge port disposed superjacent to the second conically-shaped end for controllably releasing at least a portion of the water maintained within the internal storage volume of the elongated container.

23 Claims, 9 Drawing Sheets

U.S. PATENT DOCUMENTS

| | | | |
|---|---|---|---|
| 4,443,336 | A | 4/1984 | Bennethum |
| 4,957,209 | A | 9/1990 | Helin |
| 5,518,613 | A | 5/1996 | Koczur |
| 6,245,228 | B1 | 6/2001 | Kelada |
| 7,044,343 | B2 * | 5/2006 | Anue .................. 224/148.5 |
| 7,073,688 | B2 * | 7/2006 | Choi et al. ................ 222/175 |
| 7,153,438 | B2 | 12/2006 | Souter |
| 7,201,856 | B2 * | 4/2007 | Souter et al. ............... 252/181 |
| 7,250,619 | B2 | 7/2007 | Taylor |
| 2003/0042201 | A1 | 3/2003 | Sizelove et al. |
| 2003/0114430 | A1 * | 6/2003 | MacLeod et al. ............ 514/177 |
| 2004/0188348 | A1 * | 9/2004 | Yamasaki et al. ............ 210/631 |
| 2006/0163260 | A1 * | 7/2006 | Schmidt ..................... 220/565 |
| 2007/0248489 | A1 | 10/2007 | Taylor et al. |

OTHER PUBLICATIONS

S.C. Kehoe et al., Letters in Applied Microbiology 38 (5), 410-414 doi:10.1111/1.1472-765X.2004.01515.x Published 2004.

Mendez et al., (2005). Effect of Batch-Process Solar Disinfection on Survival of Cryptosporidium parvum Oocysts in Drinking Water. Appl Environ Microbiol. Mar. 2005; 71(3): 1653-1664.doi: 10.1128/AEM.71.3.1653-1654.2005.

Procter and Gamble, MSDS, "PuR Purifier of Water," Jill Karner, Apr. 17, 2007.

Notice of Allowance Feb. 12, 2009.

* cited by examiner

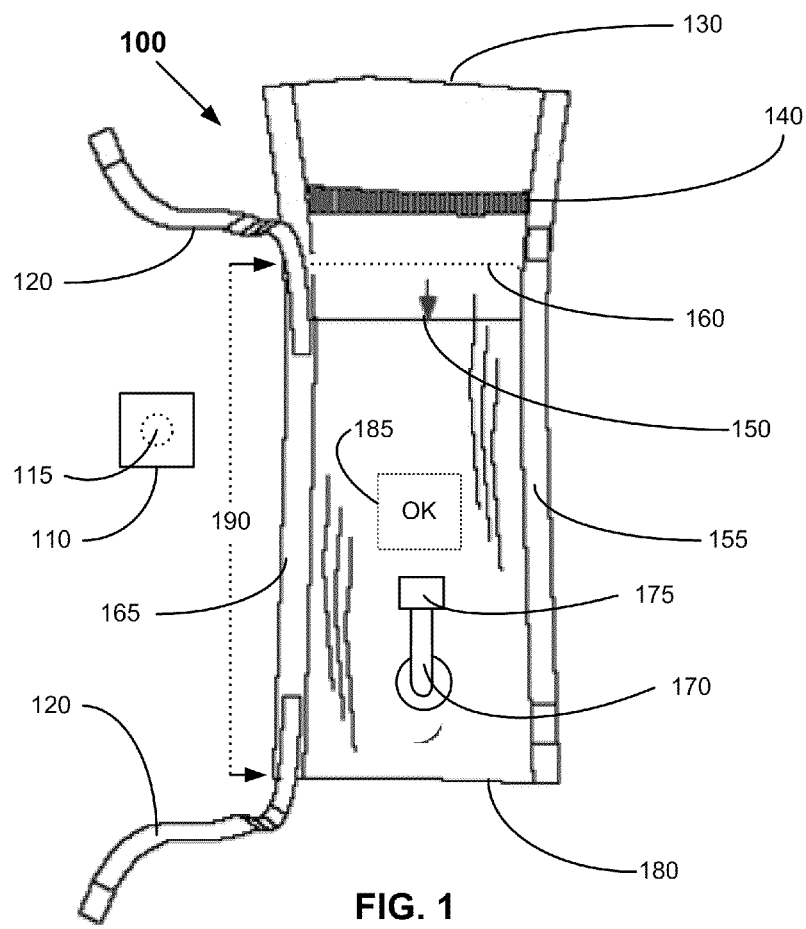
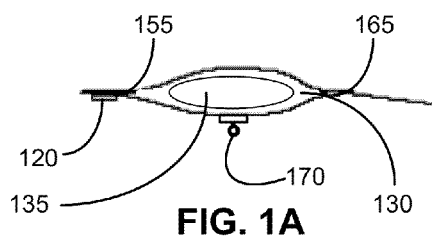
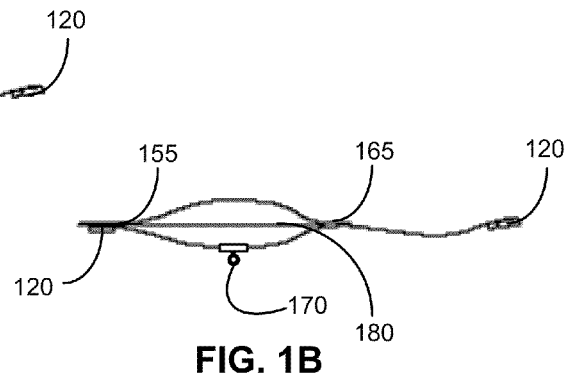

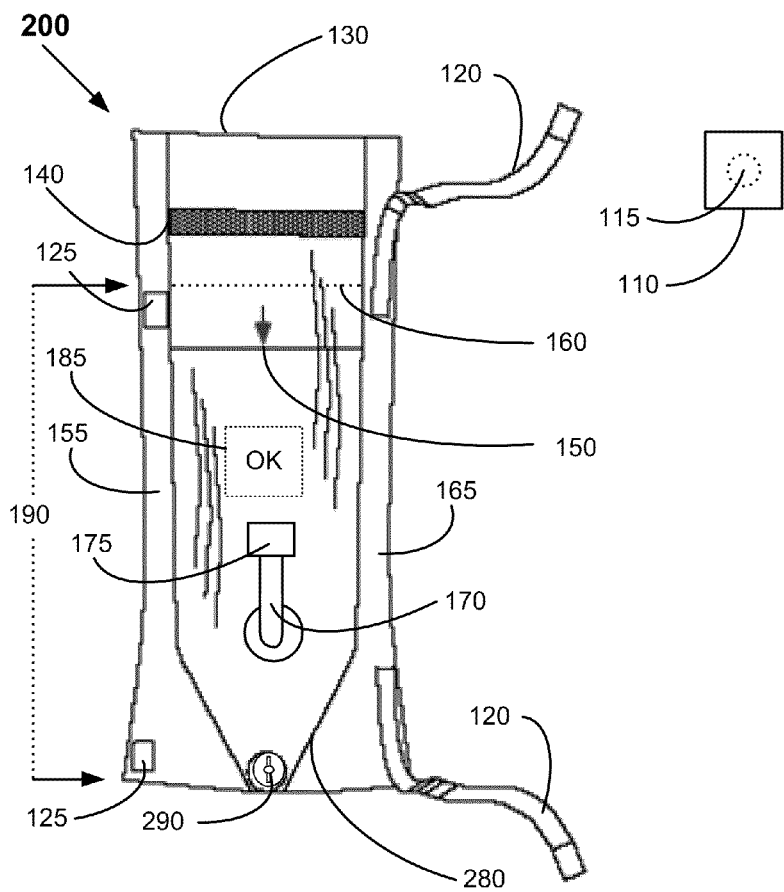
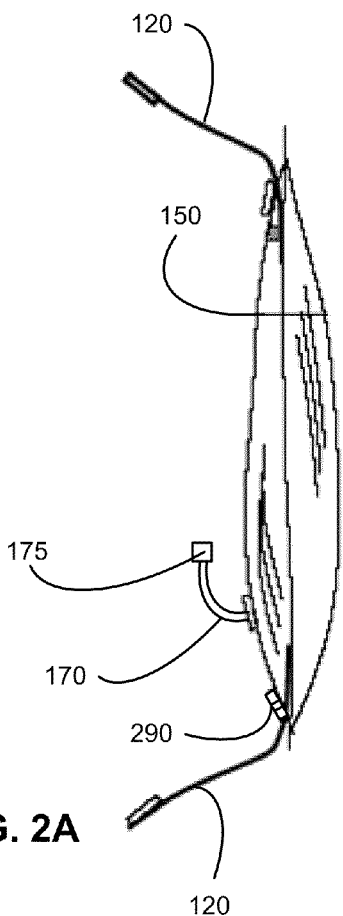
FIG. 2
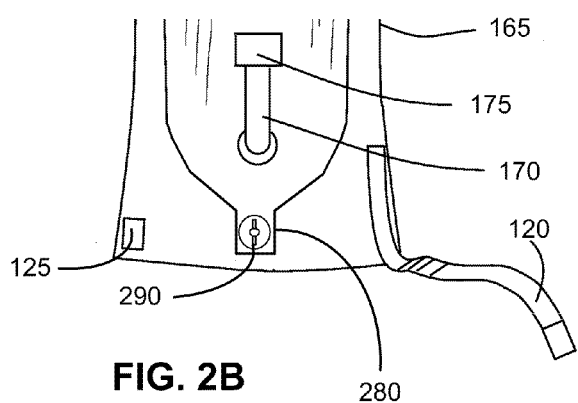
FIG. 2B
FIG. 2A

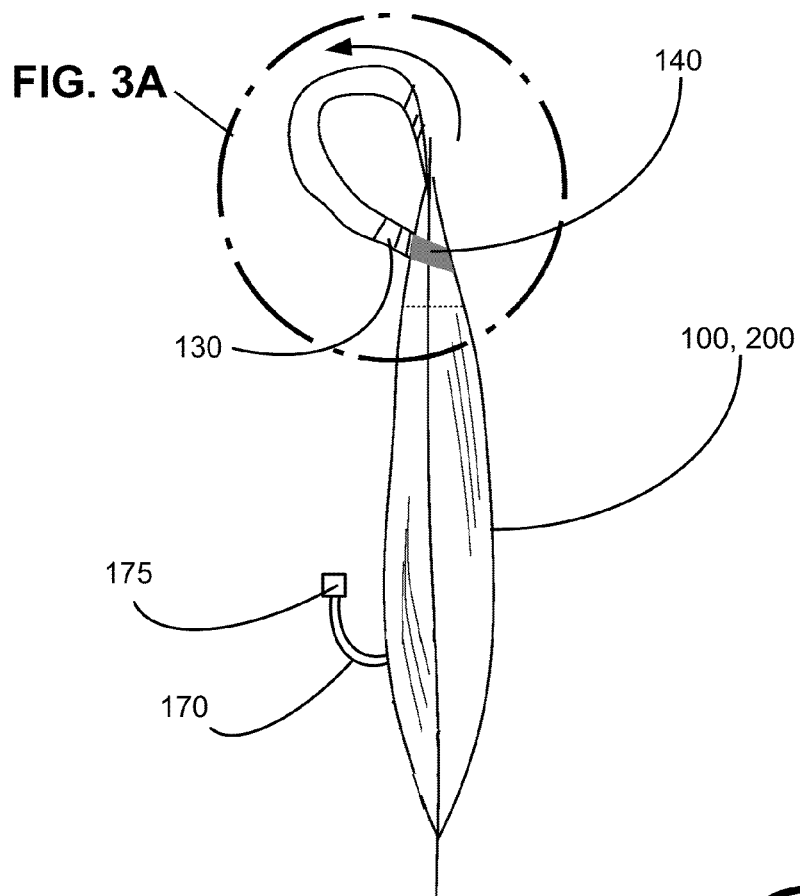
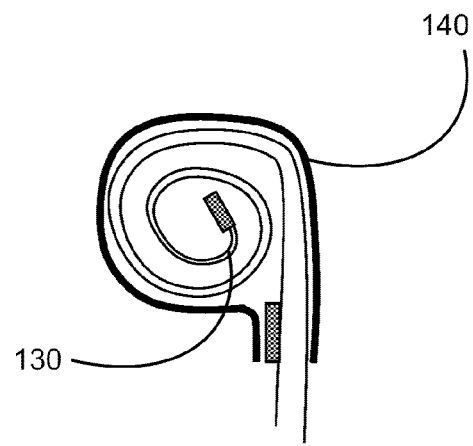
FIG. 3
FIG. 3A

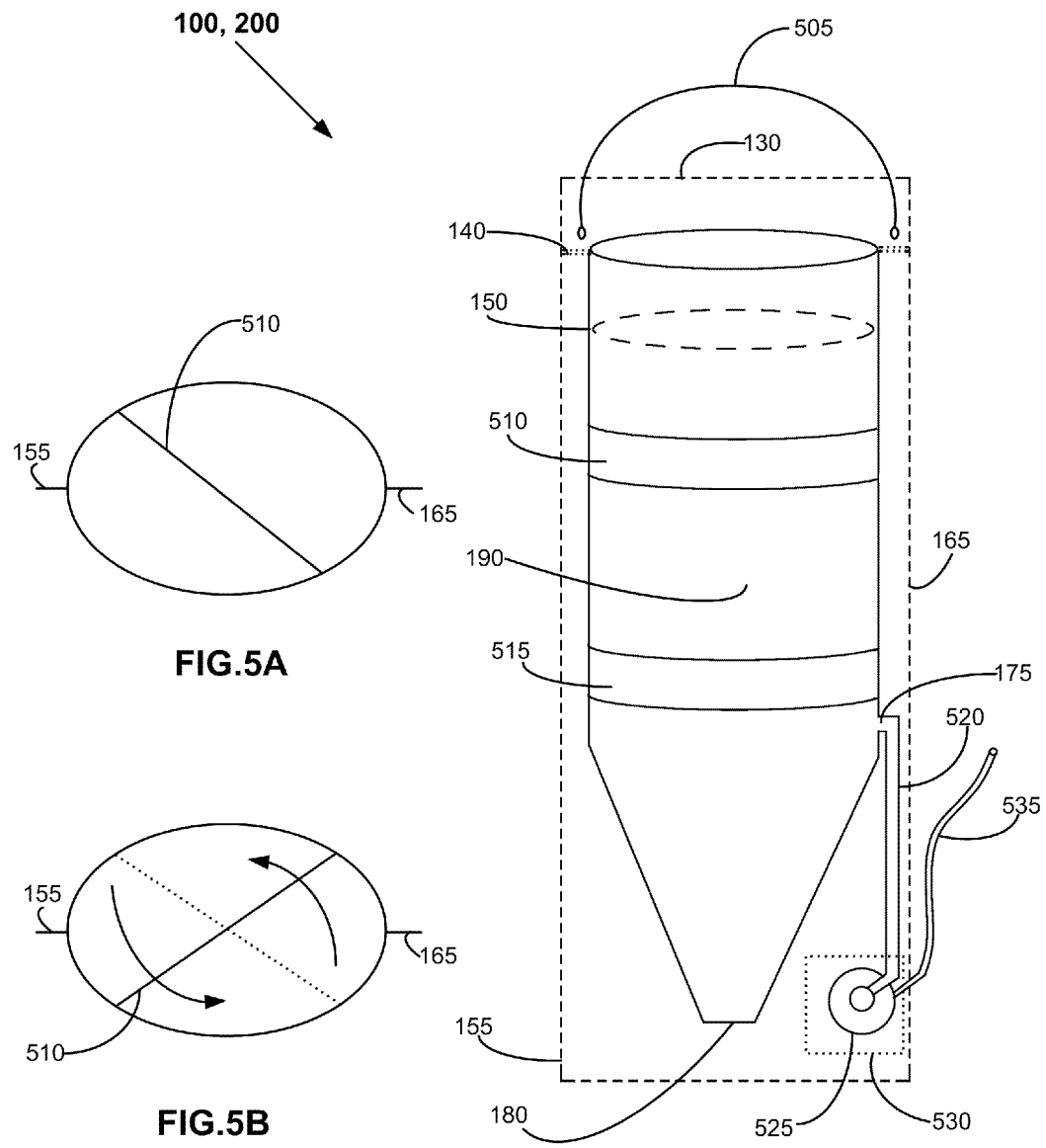

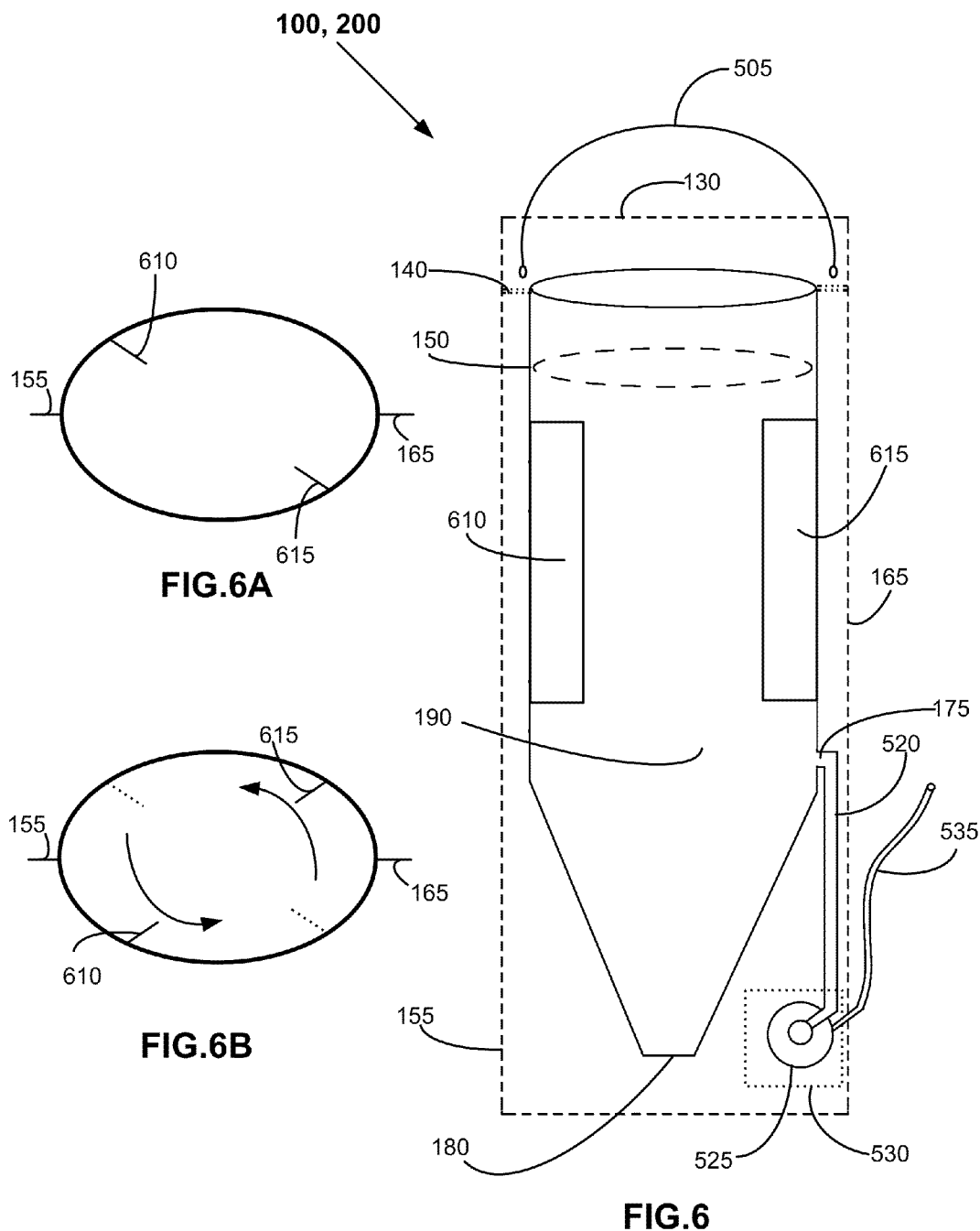

FIELD WATER PURIFICATION SYSTEM

CROSS-REFERENCE AND PRIORITY CLAIM TO RELATED APPLICATIONS

This application claims benefit and priority as a Continuation-in-part of co-pending U.S. patent application Ser. No. 12/111,130, filed Apr. 28, 2008 to a common inventor and assignee; the entire contents of which is hereby incorporated by reference as if fully set forth herein, under 35 U.S.C. §120.

RELEVANT INVENTIVE FIELD

The present disclosure generally relates to water treatment and more specifically to potable water treatment employed in a field environment.

BACKGROUND

Potable water is essential for life. However, in many parts of the world potable water is not readily available particularly under natural disasters conditions such as fires, drought, flooding or earthquakes which may have caused normal sources of potable water to become contaminated. As such, disaster relief response requires that potable water be made available to the disaster survivors as soon as possible. This frequently requires that potable water be brought in from other unaffected areas which is slow, costly and difficult to distribute to the those in the most need of the potable water. In many cases, indigenous water may be available and could suffice if adequate treatment could be performed to remove pathogenic organisms and other contaminants such as dissolved and suspended organic matter, toxic metals and sediment. As with supplied potable water, skid mounted or package water treatment systems require that the equipment be brought to the disaster location and operated from a generally centralized location from which potable water is distributed. While this response may be a viable solution over a protracted period of time, the disaster survivors located in remote areas may not be able to receive potable for several days, thus a need exists that provides a simple and effective way to provide potable water to disaster survivors before more elaborate water treatment systems are made available.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

The various exemplary embodiments described herein address the limitations of the relevant art and provides a lightweight water treatment system which can be employed by disaster survivors using locally available freshwater sources. In accordance with one exemplary embodiment, a water treatment system for purifying water in a field environment is provided. In one exemplary embodiment, the water treatment system includes a water treatment agent for treating a predetermined volume of water obtained from a local freshwater source. The water treatment agent includes a flocculant to remove suspended solids, a biocide to disinfect the obtained water from pathogenic organisms and/or activated charcoal for adsorbing hydrocarbons present in the obtained freshwater. The chemical constituency of the water treatment agent may be varied to address specific biological, chemical or radiological contaminates which may be present in the water to be treated. For purposes of this specification, the term "flocculent" includes a coagulant.

In various exemplary embodiments, the obtained freshwater is both collected and maintained in an elongated container. In one exemplary embodiment, an effective amount of the water treatment agent is provided to treat a predetermined volume of water maintained within the elongated container. The elongated container further includes an internal storage volume for maintaining the predetermined volume of water for treatment. In one exemplary embodiment, the internal storage volume includes a headspace of air occupying at least 5% of the internal storage volume when the elongated container is filled with a predetermined amount of water. The headspace of air forms an agitation bubble for mixing the water treatment agent in the predetermined volume of water maintained within the internal storage volume.

In one exemplary embodiment, a water fill port in communication with the internal storage volume is provided at a first end of the elongated container for receiving the predetermined volume of water. A sealing member is provided generally in juxtaposition to the first end of the elongated container for maintaining the volume of water within the internal storage volume for treatment. The sealing member may use a clamp, a pair of opposing and interlocking transverse ridges, tape, a twist-tie, tie-wrap, hook-and-loop fasteners, a rollable section of the elongated container, a draw string and/or any combination of these mechanisms.

A second end of the elongated container is used to receive sediment settling out of the predetermined volume of water. In one exemplary embodiment, the second end of the elongated container may include a sediment release valve for releasing sediment from the elongated container. In one exemplary embodiment, the second end of the elongated container includes a conical cross section in communication with the internal storage volume for collecting the sediment.

In one exemplary embodiment, a discharge port in communication with the internal storage volume is provided to allow the user to controllably release the water maintained within the internal storage volume of the elongated container. In one exemplary embodiment, the diameter of the discharge port may be dimensioned to provide a predetermined flow rate based on gravity flow through the discharge port.

In one exemplary embodiment, a filtration member is provided for removing impurities from water released through the discharge port. The filtration member includes an inlet nozzle configured to provide a snug fit within the discharge port, a filter case which contains a filter element, and an outlet nozzle configured to provide a snug fit with an end of a treated water supply conduit. In one exemplary embodiment, the treated water supply conduit is a flexible hose or straw which connects to the filtration member either in juxtaposition to the discharge port or at the conduit's distal (outlet) end.

In one exemplary embodiment, the elongated container includes a compartment or receptacle for maintaining the filtration member in juxtaposition with the discharge port.

In one exemplary embodiment, the elongated container is provided with one or more internal baffles for agitating the predetermined volume of water during treatment. The one or more baffles may be aligned longitudinally, laterally or diagonally within the internal storage volume of the elongated container.

In one exemplary embodiment, one or more straps, handles or grips are attached to the elongated container for transporting the elongated container and/or agitating the water during water treatment. The straps may be configured to allow the user to transport the elongated container as a sling, a backpack or as a neck pack.

In one exemplary embodiment, the elongated container consists essentially of a plastic bag having a thickness in a range of 6-40 mils, a storage volume in a range of 5-30 liters of water and a length-to-width ratio in a range of about 3:1-8:1.

In one exemplary embodiment, a filtration member for filtering the water released from the discharge port is provided. The filtration member may utilize a filter cloth or a wire mesh having a pore size less than 0.5 millimeters to ensure certain pathogenic organisms which may be resistant to the biocide are removed from the treated freshwater before consumption.

In one exemplary embodiment, the collected freshwater is treated using the water treatment agent. The freshwater contained in the elongated container is then agitated by longitudinally rocking the elongated container back and forth a sufficient amount to effectively mix the water treatment agent with volume of water maintained within the internal storage volume and/or axially rotating the elongated container a sufficient amount to effectively mix the water treatment agent with the freshwater maintained within the internal storage volume. Once a sufficient amount of agitation has been provided, the elongated container left undisturbed to allow settable solids to settle from the freshwater and allow the biocide sufficient time to disinfect the freshwater. In one exemplary embodiment, a clarity indicator for determining an effectiveness of the water treatment agent is provided. The clarity indicator allows the user to determine the effectiveness of the water treatment based on light transmission through the elongated container.

BRIEF DESCRIPTION OF THE DRAWINGS

The features and advantages of the water treatment system will become apparent from the following detailed description when considered in conjunction with the accompanying drawings. Where possible, the same reference numerals and characters are used to denote like features, elements, components or portions of various exemplary embodiments. It is intended that changes and modifications can be made to the described exemplary embodiments without departing from the true scope and spirit of the inventive embodiments as defined by the claims.

FIG. 1—depicts a front view of one exemplary embodiment of a water treatment system.

FIG. 1A—depicts a top view of one exemplary embodiment of a water treatment system.

FIG. 1B—depicts a bottom view of one exemplary embodiment of a water treatment system.

FIG. 2—depicts a front view of one exemplary embodiment of a water treatment system.

FIG. 2A—depicts a side view of one exemplary embodiment of a water treatment system.

FIG. 2B—depicts a detailed front view of one exemplary embodiment of a discharge port.

FIG. 3—depicts a side view of one exemplary embodiment of a sealing member.

FIG. 3A—depicts a detailed side view of one exemplary embodiment of a sealing member.

FIG. 5—depicts a side view of one exemplary embodiment of a water treatment system in which one or more lateral baffles are provided.

FIG. 5A—depicts a detailed top view of one exemplary embodiment of a water treatment system in which at least one lateral baffle is provided.

FIG. 5B—depicts a detailed top view of one exemplary embodiment of a water treatment system in which at least one lateral baffle is used as an agitator.

FIG. 6—depicts a side view of one exemplary embodiment of a water treatment system in which one or more longitudinal baffles are provided.

FIG. 6A—depicts a detailed top view of one exemplary embodiment of a water treatment system in which at least one longitudinal baffle is provided.

FIG. 6B—depicts a detailed top view of one exemplary embodiment of a water treatment system in which at least one longitudinal baffle is used as an agitator.

DETAILED DESCRIPTION

Figure 4A:
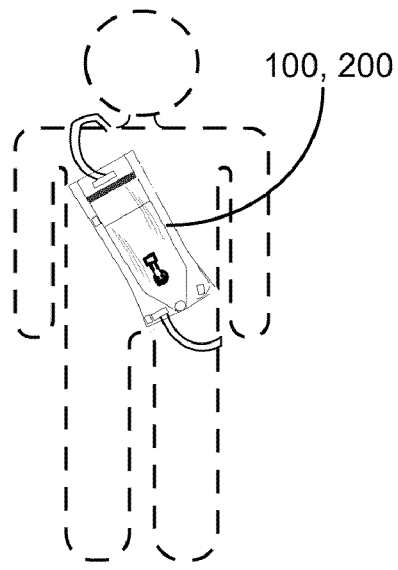
FIG. 4A—depicts one exemplary embodiment of a water treatment system arranged as a sling.

Various exemplary embodiments of a water treatment system are described. In the following description, for the purposes of explanation, numerous specific details are set forth in order to provide a thorough understanding of the various exemplary inventive features. It will be apparent, however, to a person having ordinary skill in the art that the various exemplary inventive features may be practiced without these specific details.

In one exemplary embodiment, a lightweight water treatment system which can be easily distributed and employed by the disaster survivors for treating locally available freshwater sources. In accordance with one exemplary embodiment, a water treatment system for purifying water in a field environment is provided. In one exemplary embodiment, the water treatment system includes a water treatment agent for treating a predetermined volume of water obtained from a local freshwater source. The water treatment agent includes a flocculant to remove suspended solids, a biocide to disinfect the obtained water from pathogenic organisms and/or activated charcoal for adsorbing hydrocarbons present in the obtained freshwater. The chemical constituency of the water treatment agent may be varied to address specific biological, chemical or radiological contaminates which may be present in the raw water to be treated. For example, ferric sulfate which is commonly used as a coagulating agent in conjunction with polymeric flocculating agents may be replaced with ferrous sulfate to change the oxidation state of contaminants and/or to bind with dissolved toxic metals such as arsenic, selenium, nickel, cadmium, lead and radium. Alternately, or in addition to the water treatment agent, chelating agents, for example, EDTA may be added to sequester harmful dissolved metals from the raw water.

Analogously, the type of biocide used may be varied typically from calcium hypochlorite to other halogenated compounds containing iodine or bromine which may prove more effective against certain types of pathogens.

By varying the treatment agents and/or biocides, it is possible to remove radioactive substances, turbidity, color, solids, colloids, dissolved organic compounds, nitrate/nitrite, pathogens, precipitation of dissolved metals/metalloids, and others toxins of concern. For example, removal of cyanobacterial toxins such as microcystin, cylindrospermopsisn, anatoxin, saxitoxin and DDT.

Referring to FIG. 1 a front view of one exemplary embodiment of an elongated container 100 is depicted. In one exemplary embodiment, the elongated container 100 is provided with a sachet 110 containing water treatment agents 115 for treating water collected using the elongated container 100. In one exemplary embodiment, the treatment agent comprises PUR(R) Purifier of Water sachets which are manufactured by Proctor and Gamble, Co. The formulations of the PUR(R) Purifier of Water sachets is described in U.S. Pat. No. 7,153,438, entitled "Water Treatment Compositions and Masking Agent," issued Dec. 26, 2006 and U.S. Pat. No. 7,201,856, entitled "Water Treatment Compositions," issued Apr. 10, 2007, both assigned to Pur Water Purification Products, Inc. The latter and former patents are hereby incorporated by reference in their entirety as if fully set forth herein.

In one exemplary embodiment, the elongated container 100 is constructed from 2 or more sheets of polymeric material, each sheet having a thickness in a range of 6-40 mils. The polymeric material from which the elongated container 100 is constructed should be flexible, strong, collapsible and resistant to puncture, abrasion, and wear. In one exemplary embodiment, the polymeric construction material is transparent or translucent to allow for ultraviolet light to act as a biocide in lieu of a biocide or after the water treatment agents 115 have been mixed with the water to be treated. Exposure to solar ultraviolet light promotes disinfection with or without use of the PUR(R) Purifier of Water sachets (i.e., solar disinfection, "SODIS".)

Potentially suitable polymeric materials for use constructing the elongated container 100 include but are not limited to low-density polyethylene, low-density linear polyethylene, high-density polyethylene, polypropylene, polyolephins, oriented polyethylene teraphthalates, polyvinyl fluoride, polyamides, polyarylsulfones, polyphthalamides, polysulfones, polyphenylsulfones, polyethersulfones, aliphatic polyketones, polyfluorocarbons, polybutadienes, polybutylene teraphthalates, polyesters, polyethylene teraphthalates, polyphenylene ethers, polyphenylene oxides, polyphenylene sulfides, polyphthalate carbonates, polypropylenes, polystyrenes, polyurethanes, polyvinyl chlorides. Thermoplastics are typically used due to their recycling ability. However, one skilled in the art will appreciate that various polymeric construction materials may be used to achieve a specific requirement.

Two or more polymeric sheets used for construction of the elongated container 100 are arranged to form a predetermined internal storage volume 190 dimensioned to coincide with the quantity of treatment agents 115 typically provided in a PUR (R) Purifier of Water sachets 110. Standardized internal storage volumes are formed when at least two polymeric sheets are thermally fused together using high length-to-width ratios in a range of about 3:1-8:1 depending on the volume of water to be retained in the internal storage volume 190 of the elongated container 100 and/or the manner in which the elongated container 100 is intended to be transported as is provided with the discussion accompanying FIGS. 4A-4D below.

The internal storage volume 190 of the elongated container 100 are typically constructed in volumes of 5, 10, 20 or 30 liters. Larger volumes become increasing more difficult to handle and transport due to water weight, flexibility and/or structural integrity of the elongated container 100.

The two or more polymeric sheets are sealed on opposing longitudinal sides 155, 165 and laterally at the bottom end 180 (FIG. 1B) to form the elongated container 100. The bottom end 180 (FIG. 1B) of the elongated container 100 is used to collect sediments settling out of the water being treated within the internal storage volume 190.

Excess polymeric sheeting materials adjacent to seams surrounding the elongated container 100 formed by the thermal fusion process may used for attaching one or more straps 120, handles and/or grips 125 to the elongated container 100 for transporting the water treatment system as is provided with the discussion accompanying FIGS. 4A-4D below. In one exemplary embodiment, the remaining excess polymeric sheeting material is simply cut away from the completed elongated container 100.

The top end 130 opposite the sealed end 180 is used as a wide mouth port 135 (FIG. 1A) to admit water to be treated into the internal storage volume 190. An optional fill line marking 150 may be provided on the elongated container 100 to provide a visual indication to a user of the quantity of water to be collected. The internal storage volume 190 includes sufficient head space 160 to allow for the formation of an air bubble. The air bubble is used to create a mixing vortex for mixing the water treatment agents 115 with the water contained in the internal storage volume 190 as is provided with the discussion accompanying FIG. 6 below.

The elongated container 100 is provided with a sealing member 140 to close the wide mouth port 135 of the elongated container 100. In one exemplary embodiment, the sealing member 140 is constructed from hook-and-loop fasteners (e.g., Velcro™) as is provided with the discussion accompanying FIGS. 3 and 3A below. In various embodiments, the sealing member 140 may be a draw string, a separately provided clamp, a pair of opposing and interlocking transverse ridges (e.g., Ziploc™), tape (e.g., duct tape), a twist-tie, a tie-wrap or any other simple sealing device.

In one exemplary embodiment, a discharge port 175 is mounted on a stem 170 for releasing treated water from the internal storage volume 190. The elongated container 100 may be oriented so as to allow gravity feed of water through the discharge port 175. The discharge port should be located about 3"-6" above the bottom end of 180 of the elongated container 100, 200 or otherwise superjacent to the bottom end 180. Alternately, a user may squeeze the elongated container 100 to force water from the internal storage volume 190 and out through the discharge port 175. In one exemplary embodiment, the discharge port 175 requires an upward or downward pulling action to allow water to be released from the internal storage volume 190. The stem 170 is attached through the wall of the elongated container 100 typically by a thermal fusion process or an adhesive and/or vulcanization process. One skilled in the art will appreciate that any suitable valve mechanism will work with the arrangement.

In one exemplary embodiment, a clarity indicator 185 is provided which allows a user to visually determine the effectiveness of the treatment agents based on the ability to observe a graphic and/or text through the elongated container 100. The clarity indicator 185 may be a simple adhesive label applied to the elongated container after construction.

Referring to FIG. 2, a second exemplary embodiment of the elongated container 200 is depicted. In this embodiment, the bottom end 280 of the internal storage volume 190 is provided with a conical shape to facilitate the capture and removal of sediment from the internal storage volume 190. A drain plug 290 is provided to allow the captured sediment to be removed from the bottom end of the elongated container 200. The removal of the captured sediment may be advantageous in certain situations to improve disinfection of the water remaining in the internal storage volume 190 and/or to prevent resuspension of flocculant. All other aspects of this embodiment are similar to those provided in the discussion accompanying FIGS. 1, 1A, 1B.

Referring to FIG. 2A a side view of the second embodiment of the elongated container 200 is depicted. In this embodiment, the general baglike structure of the elongated container 200 is visible. As previously discussed, the dimensions of the elongated container 200 is dependent on the desired internal storage volume 190 (FIG. 2) and/or the way in which the elongated container is intended to be transported. FIG. 2B depicts a detailed front view of one exemplary embodiment a lower portion of the elongated container 200 in which the bottom end 280 is tapered to allow the captured sediment to be removed from the bottom end of the elongated container 200. Hereinafter, the various embodiments of the elongated container will be referred to as the elongated container 100, 200.

Referring to FIG. 3, one exemplary embodiment of a sealing member 140 is depicted in which an upper portion of the various embodiments of the elongated container 100, 200 above a fill line marking 150 is rolled up and held in place by hook-and-loop fasteners 140 as is depicted in FIG. 3A. In this embodiment, one or more strips of hook-and-loop fasteners 140 extend longitudinally over the end 130 of the elongated container 100, 200 and securely maintain the rolled portion of the elongated container in place to prevent collected water from being accidentally released through the wide mouth port 135 (FIG. 1A).

Referring to FIG. 4A-D, a plurality of transport arrangements are possible by changing the positions and/or adding straps 120 to the elongated container 100, 200. For example, in FIG. 4A, the elongated container 100, 200 is configured as a sling in which a person is able to transport collected water by draping a strap diagonally across a trunk of the body. In the sling configuration, a length-to-width ratio of 3:1 to 8:1 (when sealed) is generally used for internal storage volumes 190 (FIGS. 1 and 2) ranging between 10 and 20 liters of water. In one exemplary embodiment, the elongated container 100, 200 is approximately 36" in length with a diameter of approximately 5" for containing about 10 liters. In one exemplary embodiment, the elongated container 100, 200 is approximately 36" in length with a diameter of approximately 7" for containing about 20 liters of water. When configured with the length-to-width ratio of 3:1 to 8:1, the elongated container 100, 200 essentially forms a flexible cylinder which conforms to the person's shape during transport.

Figure 4B:
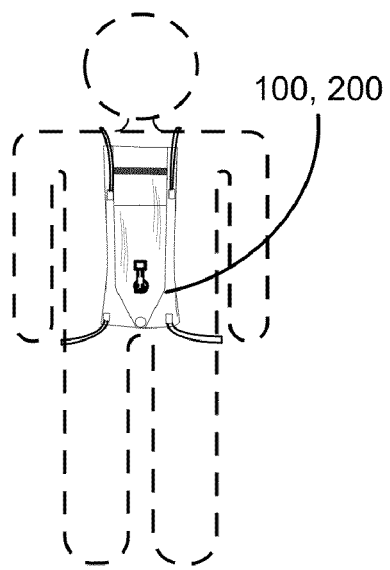
FIG. 4B—depicts one exemplary embodiment of a water treatment system arranged as a backpack.

In FIG. 4B, the elongated container 100, 200 is configured as a backpack. In this exemplary embodiment, the length-to-width ratio ranges from about 3:1-4:1. In this embodiment, the length of the internal storage volume 190 (FIGS. 1 and 2) is about 22" with a diameter of approximately 6" for 10 liters of water. For 20 liters of water the diameter is increased to approximately 8.5".

Figure 4C:
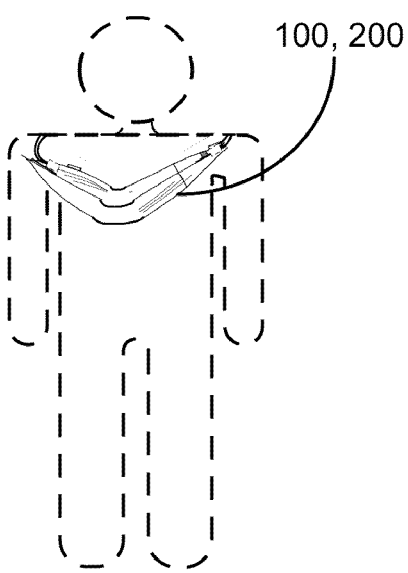
FIG. 4C—depicts one exemplary embodiment of a water treatment system arranged as a neck pack.

In FIG. 4C, the elongated container 100, 200 is configured as a neck pack. In this exemplary embodiment, the length-to-width ratio and dimensions approximates those of the sling configuration shown in FIG. 4A. However, the dimensions of any of the transport configurations may be adjusted to better serve populations of various statures.

Figure 4D:
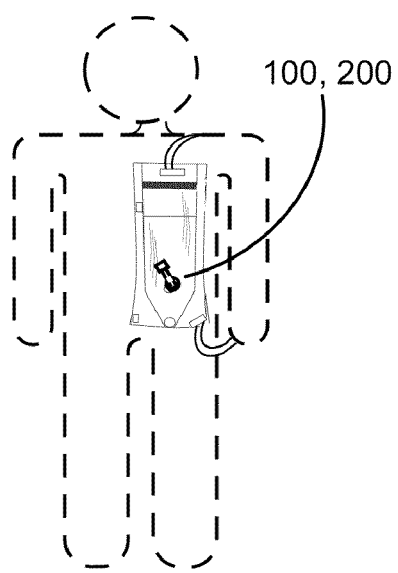
FIG. 4D—depicts one exemplary embodiment of a water treatment system arranged as a purse pack.

In FIG. 4D, the elongated container 100, 200 is configured as a purse pack which is carried or hung from a shoulder of the person. In this exemplary embodiment, the length-to-width ratio and dimensions approximates those of the sling configuration shown in FIG. 4A. However, the dimensions of any of the transport configurations may be adjusted to better serve populations of various statures.

FIG. 5 depicts one exemplary embodiment of the elongated container 100, 200 in which one or more lateral baffles 510, 515 are provided to improve mixing of water to be treated within the internal storage volume 190. In one exemplary embodiment, a handle, strap, or like grip 505 is provided which may attached to an upper portion of the elongated container 100, 200 in proximity to the wide mouth port 135. In this embodiment, a user maintains the elongated container 100 in an upright position as shown in FIG. 5A (top view) and axially rotates the elongated container 100 back and forth as shown in FIG. 5B. The lateral baffles 510, 515 improve mixing efficiency by causing eddies and bubbles to be formed in the internal volume of water contained in the elongated container 100, 200. The lateral baffles 510, 515 may be constructed from the same materials used to form the elongated container 100, 200 or made from a more rigid material.

In one exemplary embodiment, a filtration member 525 is configured to receive water from the discharge port 175, typically by a short conduit 520 which sealingly couples the discharge port to the filtration member 525. The discharged water is filtered by the filtration member 525 and released to a treated water supply conduit 535 for consumption. In one exemplary embodiment, the filtration member 525 is maintained within a compartment or receptacle 530 formed by two or more parallel sheets of polymeric material. Alternately, a separate compartment or receptacle may be affixed to the elongated container 100, 200 proximate to the discharge port 175.

FIG. 6 depicts one exemplary embodiment of the elongated container 100, 200 in which one or more longitudinal baffles 610, 615 are provided to improve mixing of water to be treated within the internal storage volume 190. In one exemplary embodiment, a handle, strap, grip or the like 505 is provided which may attached to an upper portion of the elongated container 100, 200 in proximity to the wide mouth port 135. In this embodiment, a user maintains the elongated container 100, 200 in an upright position as shown in FIG. 5A (top view) and axially rotates the elongated container 100, 200 back and forth as shown in FIG. 5B. Analogous to the lateral baffles 510, 515 discussed above, the longitudinal baffles 610, 615 improve mixing efficiency by causing eddies and bubbles to be formed in the internal volume of water contained in the elongated container 100, 200. Likewise, the longitudinal baffles 610, 615 may be constructed from the same materials used to form the elongated container 100, 200 or made from a more rigid material.

Also as discussed above, in one exemplary embodiment, a filtration member 525 is configured to receive water from the discharge port 175, typically by a short conduit 520 which sealingly couples the discharge port to the filtration member 525. The discharged water is filtered by the filtration member 525 and released to a treated water supply conduit 535 for consumption. In one exemplary embodiment, the filtration member 525 is maintained within a compartment or receptacle 530 formed by two or more parallel sheets of two or more parallel. Alternately, a separate compartment or receptacle may be affixed to the elongated container 100, 200 proximate to the discharge port 175.

Figure 7A:
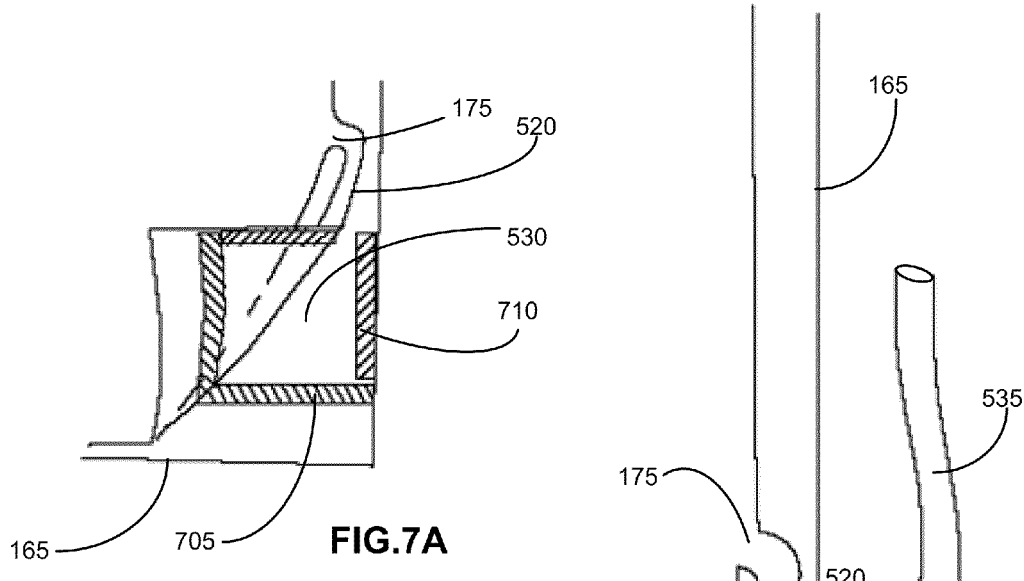
FIG. 7A—depicts a detailed side view of one exemplary embodiment of a receptacle in which a filtration member for maintaining a filter member.
Figure 7:
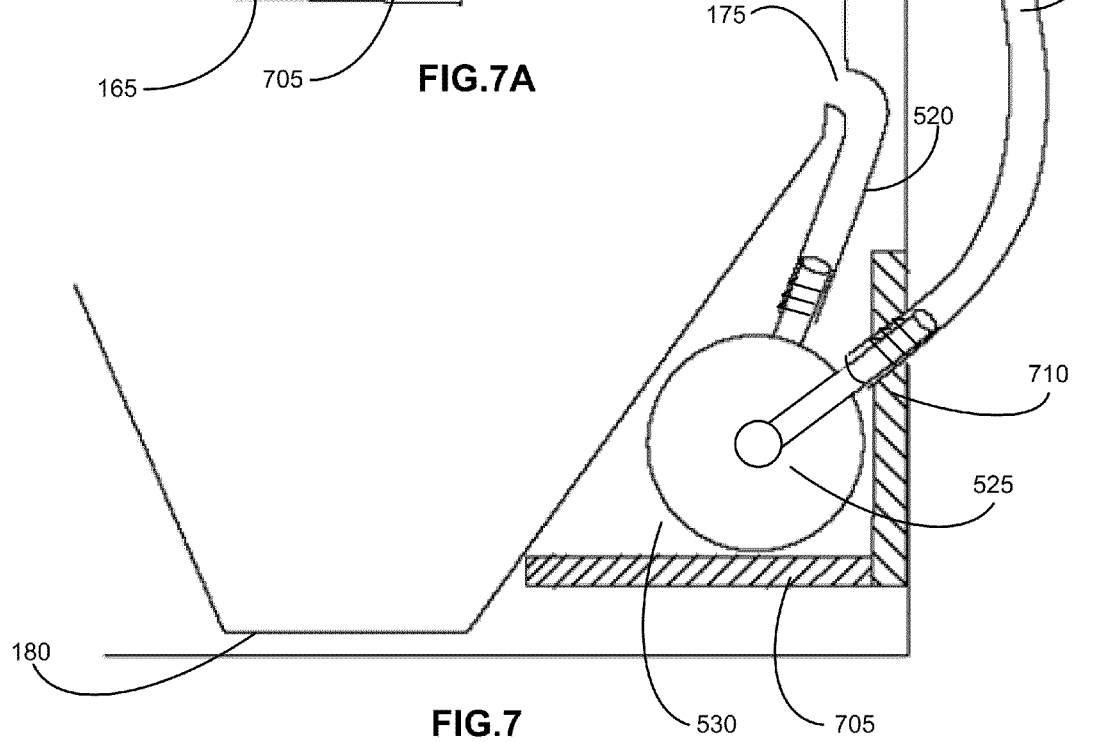
FIG. 7—depicts a side view of one exemplary embodiment of a water treatment system in which a filtration member is maintained within a receptacle.

FIG. 7 depicts one exemplary embodiment of an elongated container 100, 200 in which a filtration member 525 is maintained within a compartment or receptacle 530 formed from parallel sheets of polymeric material or pouch fused to the elongated container 100, 200 along a lateral surface to all a person set elongated container 100, 200 on an end. In one exemplary embodiment, the filtration member 525 receives treated water from the discharge port 175 and is disposed superjacent to the conical end 180 of the elongated container 100, 200. The treated water is routed to the filtration member 525 by a short conduit 520, filtered by the filtration member 525 and discharged into an end of the treated water supply conduit 535. FIG. 7A illustrates the two or more parallel sheets of polymeric material 705, 710 which form the compartment or receptacle 530 in which the filtration member 525 is maintained. The two or more parallel sheets of polymeric material 705, 710 may encompass the filtration member 525 by use of a pair of opposing and interlocking transverse ridges, tape, a twist-tie, a tie-wrap, hook-and-loop fasteners, snap fasteners and any combination thereof.

Figure 8:
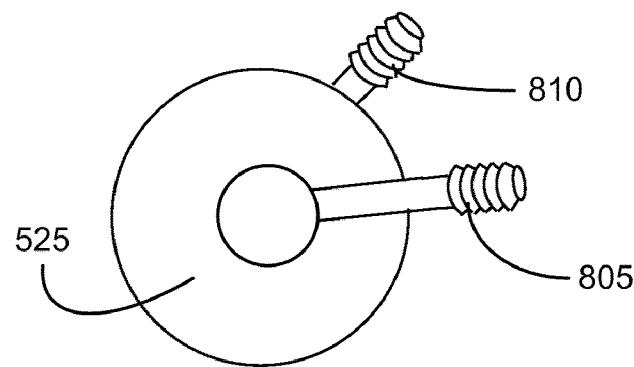
FIG. 8—depicts a top view of one exemplary embodiment of a filtration member suitable for use with a water treatment system.

FIG. 8 depicts one exemplary embodiment of a filtration member 525 suitable for use with the water treatment system. In one exemplary embodiment, the filtration member is configured as a generally circular container having a relatively thin cross-sectional profile in order to be maintained in the compartment or receptacle 530 described above.

Figure 8A:
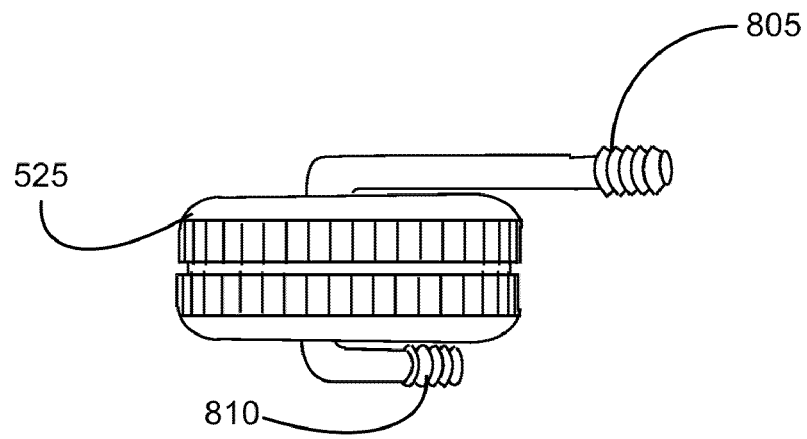
FIG. 8A—depicts a side view of one exemplary embodiment of a filtration member suitable for use with a water treatment system.
Figure 8B:
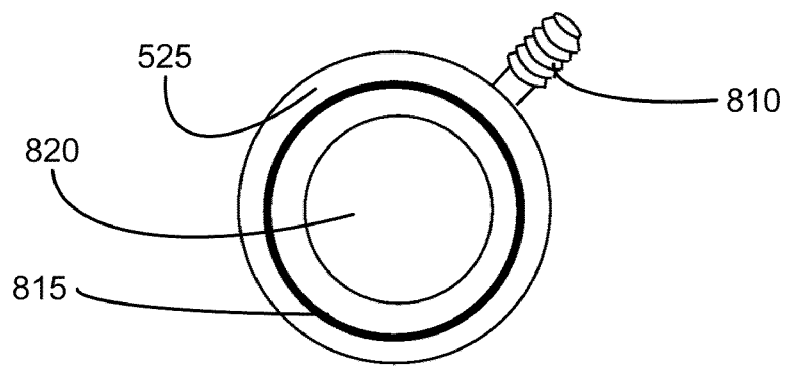
FIG. 8B—depicts a top view of one exemplary embodiment of a separated filtration member suitable for use with a water treatment system.

An inlet nozzle 805 is provided on one side of the filtration member 525 which receives water to be filtered internally. An outlet nozzle 810 is provided on an opposite side of the filtration member 525 which discharges the filtered water to the treated water supply conduit 535 as described above. FIG. 8A provides a side view of the filtration member 525. In one exemplary embodiment, the filtration member 525 is provided in a clamshell arrangement (not shown) in which each half of the filtration member 525 separate in opposition using a hinge to allow access to a filter 820 (FIG. 8B).

In another embodiment, the filtration member 525 is provided in a two part threaded arrangement (not shown) in which each half of the filtration member 525 is thread coupled together. Access to the filter element 820 (FIG. 8B) is accomplished by unscrewing one half of the filtration member 525 from the other half. FIG. 8B provides an internal view of the filtration member 525 in which the filter element 820 is concentrically maintained within one half of the filtration member 525. In one exemplary embodiment, an "O" ring 815 is provided to prevent leakage of the water to be treated from the filtration member 525. The filter element 820 may utilize woven or non-woven fibers, ceramic membranes or other filter media known in the relevant art.

For fabric (woven or nonwoven) filters or screens should be selected with an effective porosity of ≦0.5 mm openings. Actual filter media should utilize an effective pore size of 0.2 to 300 μm with an initial target range of 0.5 to 10 μm. In addition, the filter element 820 may include other water treatment agents such as activated charcoal and/or biocides to improve the quality of water to be consumed by the person.

On skilled in the art will appreciate that any number of filtration member configurations and filter media types may be used. For example, the filtration member 525 may be directly connected to the discharge port 175 without the short conduit 520. Alternately, the filtration member could be directly attached to the discharge end of the treated water supply conduit 535 which would eliminate the short conduit 520 altogether.

Figure 9:
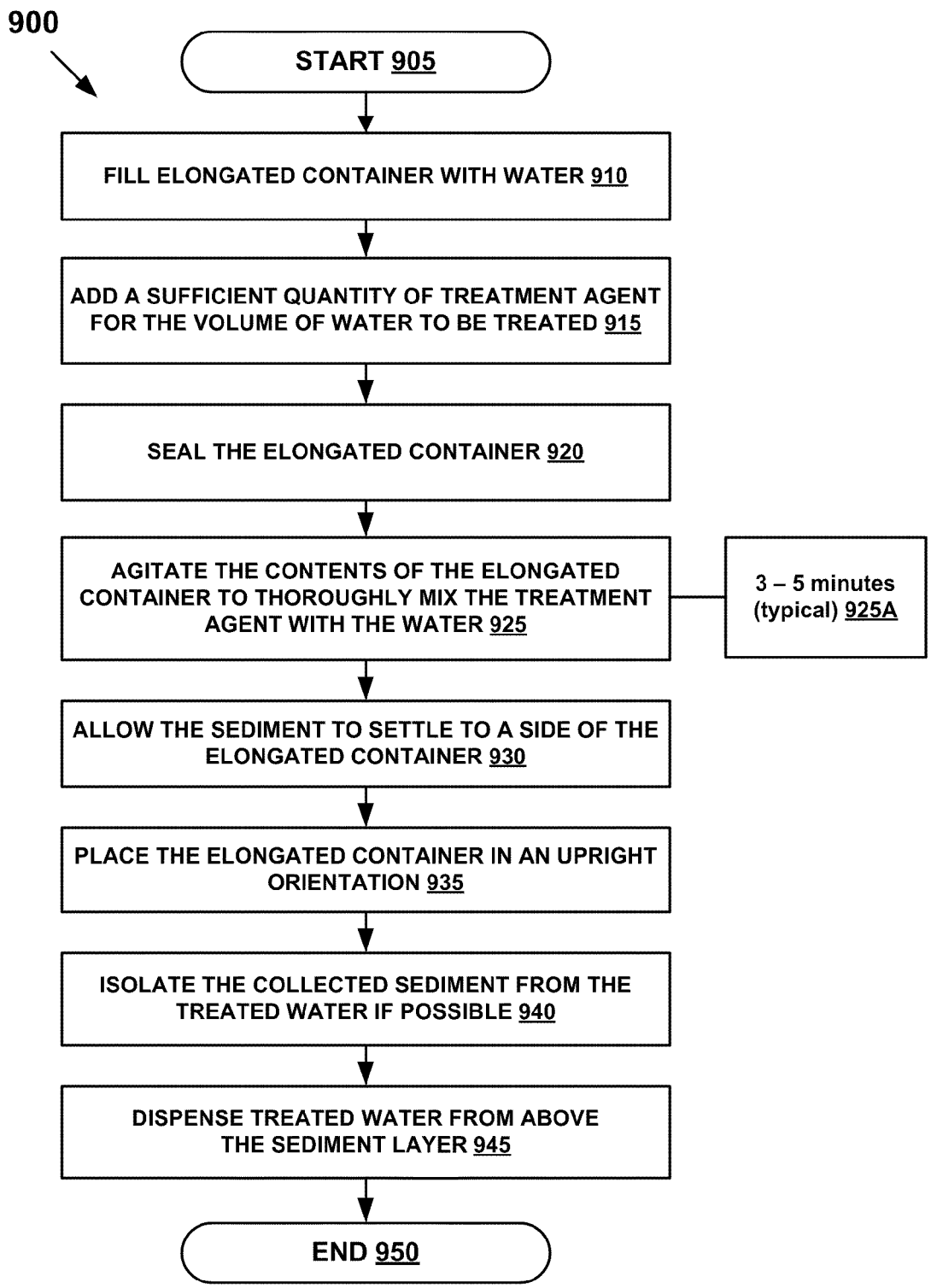
FIG. 9—depicts a process for treating water using one exemplary embodiment of the water treatment system.

Referring to FIG. 9, a process for treating water using either embodiment of the water treatment system is depicted. The process 900 is initiated 905 by a user filling 910 an elongated container 100, 200 to the fill line marking 150. The large mouth port 135 may be stretched open by hand and submerged into a water source, such as a stream, in order to fill the elongated container 100, 200. The water level in the elongated container 100, 200 should allow room in order for a mixing bubble of a predetermined size to form within the headspace 160.

The collection of twigs, leaves, large particles and other debris should be minimized where possible. In one exemplary embodiment, a mesh or cloth filter is provided to inhibit the collection of the solid matter. Floating matter such as oils and scum should likewise be avoided by collecting from below the water surface. If floating matter is inadvertently collected, the user may squeeze the elongated container sufficiently to discharge the floating matter out through the large mouth port 135.

The large mouth port 135 at the end of the elongated container 130 is then sealed using the sealing member 140 as previously described above. The elongated container 100, 200 is then carried and/or transported to a safe location as necessary for performing the water treatment.

To treat the collected water, the large mouth port 135 at the end of the elongated container 130 is opened and the provided treatment agents are added 915. The treatment agents may be in the form of a single powder, liquid, or tablet as is provided in the PUR(R) Purifier of Water discussed above. The PUR (R) Purifier of Water is intended to treat volumes of water in 10 liter amounts. Therefore, greater volumes will require additional sachets of PUR(R) Purifier of Water. Alternately, separate disinfectants, coagulants, flocculants and/or chelating agents may be added in lieu of the PUR(R) Purifier of Water in amounts specified by the manufacturer of the specific water treatment agent. In one exemplary embodiment, powdered activated charcoal may be included with the water treatment agents to remove organic contaminants such as gasoline or pesticides. Once the water treatment agents have been added to the water to be treated, the large mouth port 135 at the end of the elongated container 130 is then resealed using the sealing member 140 as previously described above 920.

The contents of the elongated container 100, 200 is then agitated to thoroughly mix the treatment agents with the collected water 925. Agitation is typically performed for 3 to 5 minutes to ensure sufficient flocculation and mixing of the treatment agents with the water to be treated 925A. Agitation may be accomplished by the user grasping the two ends 130, 180 of the elongated container 100, 200 and repeatedly inverting the elongated container 100, 200 to cause bubbles to rapidly move from one end of the elongated container 100, 200 to the other. Alternately, the elongated container 100, 200 may be axially rotated to cause thorough mixing as described above. Vigorous agitation should be continued for approximately 30 seconds. The generated bubbles provide displacement mixing by creating vortexes in the water during movement. The optimal rate of inverting or axial oscillations is 30-60 cycles per 30 seconds of rapid mixing.

Alternately, the elongated container 100, 200 may be axially rolled on the ground, or shaken from end-to-end by alternately lifting and lowering an end of the elongated container 100, 200. Following the vigorous agitation, agitation is initiated for about 3 to 10 minutes by rocking or axially rotating the elongated container 100, 200 at rate of approximately 75 to 110 oscillations per minute. Bubbles and/or baffles 510, 515, 610, 615 included in the elongated container 100, 200 provide the displacement agitation to create flocs that are large enough to rapidly settle.

Alternately, transporting the elongated container 100, 200 on foot for 10-20 minutes also may provide sufficient agitation. If a smooth, lateral surface is available, the elongated container 100, 200 may be rolled for 3-10 minutes to achieve the agitation. Longer agitation times may be required when water temperatures are below approximately 15° C.

In one exemplary embodiment, the elongated container 100, 200 is then placed in a horizontal orientation to allow sediment to settle 930 to the bottom of the elongated container 100, 200 for at least 5 minutes, or until no flocs are visible in the treated water. In another embodiment, the elongated container 100, 200 is maintained in a vertical orientation which allows the flocculant to settle into the conical end 180 of the elongated container 100, 200. In one exemplary embodiment, a sequence of horizontal and vertical orientations of the elongated container 100, 200 during settling may be advantageous. For example, allowing the flocculant to settle in a horizontal alignment for 5-15 minutes, followed by vertically orienting the elongated container 100, 200 until a total of 30 minutes has elapsed. (30 minutes is approximately the amount of time needed for disinfection by the biocide.)

An indicator of successful flocculation and sedimentation is the improved clarity of the treated water, which should be apparent through the translucent polymeric construction of the elongated container 100, 200. After the horizontal settling, the elongated container 100, 200 is carefully placed in an upright orientation 935 by slowly lifting one end of the elongated container until the sediment moves to the collection end 180, 280 of the elongated container 100, 200. Vertical settling should be assumed to be completed when no flocs are visible in the water column. Tapping of the walls of the elongated container 100, 200 may be required to dislodge any clinging flocs.

If possible, the collected sediment should be isolated from the clarified water 940 as the accumulated sediment may still contain live pathogenic organisms and thus should not be allowed to contaminate the treated water 940. The sediment isolation may be accomplished by placing a clamp across the elongated container 100, 200 at about three to six inches above the sediment layer or alternately by using the drain plug 290 available in the second embodiment of the elongated container 200.

The treated water may be dispensed from the clarified end of the elongated container 100,200 after the sediment is removed or isolated and after disinfection has been completed 945. The discharge port 175 may included an integrated valve, filtration member 525 and/or closeable stem 170 coupled to one wall of the elongated container 100, 200. If filtration is provided at the discharge port 175, the closure of the discharge port should be nearly flush with the wall of the elongated container 100, 200 in order to minimize the risk of trapping flocs potentially containing pathogens in the stem 170. This completes the water treatment process 950.

In the foregoing specification, the various exemplary inventive features have been described with reference to specific embodiments herein. For example, the elongated container 100, 200 and water treatment agent 110 may be used for military and/or recreational purposes as well as disaster relief. It will, however, be appreciated by a person having ordinary skill in the art that various modifications and changes may be made thereto without departing from the broader spirit and scope of the various inventive embodiments disclosed. The specification and drawings are, accordingly, to be regarded in an exemplary rather than a restrictive sense.

What is claimed:

1. A water treatment system for purifying water in a field environment comprising:
   an elongated container comprising;
      a first wall;
      a second wall opposite to the first wall, the first wall and the second wall being constructed from a flexible material;
      an internal storage volume for maintaining a predetermined volume of water;
      the internal storage volume including a predetermined headspace volume within the internal storage volume when the elongated container is filled with the predetermined volume of water;
      at least one lateral baffle having a first end coupled to an inside surface of the first wall and a second end coupled to an inside surface of the second wall;
      a water fill port in communication with the internal storage volume provided at a first end of the elongated container for receiving the predetermined volume of water to be maintained within the internal storage volume of the elongated container;
   a sealing member disposed at the first end of the elongated container for maintaining the volume of water within the internal storage volume;
   a second end of the elongated container for receiving sediment settling out of the predetermined volume of water maintained within the internal storage volume; and,
   a discharge port disposed superjacent to the second end for controllably releasing at least a portion of the water maintained within the internal storage volume of the elongated container wherein the discharge port is configured to only discharge water above the settled sediment received in the second end.

2. The water treatment system according to claim 1 wherein the elongated container consists essentially of an elongated plastic bag having a thickness in a range of 6-40 mils, a storage volume in a range of 5-30 liters of water and a length-to-width ratio in a range of between 3:1 and 8:1.

3. The water treatment system according to claim 1 wherein the sealing member is selected from the group consisting essentially of a clamp, a pair of opposing and interlocking transverse ridges, tape, a twist-tie, a tie-wrap, hook-and-loop fasteners, a rollable section of the elongated container, a draw string and any combination thereof.

4. The water treatment system according to claim 1 wherein the predetermined headspace occupies at least 5% of the internal storage volume.

5. The water treatment system according to claim 1 further comprising:
   a filtration member for removing impurities from water released through the discharge port, the filtration member comprising:
      an inlet nozzle configured to sealingly couple with the discharge port;
      a filter case for maintaining a filter element in communication with water released through the discharge port;
      an outlet nozzle configured to sealingly couple with an end of a treated water supply conduit; and,
      the filter element for filtering impurities from water flowing therethrough.

6. The water treatment system according to claim 5 wherein the filtration member is disposed intermediate with the elongated container and an end of the treated water supply conduit.

7. The water treatment system according to claim 5 wherein the elongated container further comprises a receptacle for maintaining the filtration member in juxtaposition with the discharge port.

8. The water treatment system according to claim 1 wherein the at least one lateral baffle is constructed from at least one of a flexible material as used to construct the first wall and the second wall or a more rigid material.

9. The water treatment system according to claim 1 wherein the second end of the elongated container includes a conical shape for receiving the settled sediment.

10. The water treatment system according to claim 1 further comprising an effective amount of a water treatment agent for treating the predetermined volume of water maintained within the internal storage volume of the elongated contained.

11. The water treatment system according to claim 10 wherein the water treatment agent includes at one of a flocculent, a biocide, a pH buffer, an oxidizing agent, a coagulant and an adsorbent.

12. The water treatment system according to claim 1 wherein at least one of the first end or the second end of the at least one lateral baffle is coupled to the respective inside surface of the first wall or the respective inside surface of the second wall in a substantially longitudinal orientation.

13. A water treatment system for purifying water in a field environment comprising:
an elongated container comprising;
a first wall;
a second wall opposite to the first wall, the first wall and the second wall being constructed from a flexible material;
a water fill port in communication with the internal storage volume provided at a first end of the elongated container for receiving a predetermined volume of water to be maintained within an internal storage volume of the elongated container;
sealing member for sealing the elongated container disposed in juxtaposition to the first end of the elongated container;
at least one lateral baffle having a first end coupled to an inside surface of the first wall and a second end coupled to an inside surface of the second wall, the at least one baffle constructed from a flexible material as used to construct the first wall and the second wall of the elongated container for improving agitation of the predetermined volume of water maintained within the internal storage volume of the elongated container;
a second conically-shaped end of the elongated container for receiving sediment settling out of the predetermined volume of water maintained within the internal storage volume; and,
a discharge port disposed superjacent to the second conically-shaped end for controllably releasing at least a portion of the water maintained within the internal storage volume of the elongated container wherein the discharge port is configured to only discharge water above the settled sediment received in the second conically-shaped end.

14. The water treatment system according to claim 13 wherein the sealing member is selected from the group consisting of a clamp, interlocking transverse ridges, tape, a twist-tie, tie-wrap, hook-and-loop fasteners, a rollable section of the elongated container above a fill line marking and any combination thereof.

15. The water treatment system according to claim 13 further comprises at least one of a handle, strap or grip coupled to the elongated container.

16. The water treatment system according to claim 13 further including a filtration member for filtering the water released from the discharge port.

17. The water treatment system according to claim 13 further comprising an effective amount of water treatment agent for treating the predetermined volume of water maintained within the internal storage volume of an elongated container, wherein the water treatment agent at least includes:
a flocculent for removing suspended matter from the predetermined volume of water maintained within the internal storage volume; and,
a biocide for disinfecting the predetermined volume of water maintained within the internal storage volume.

18. The water treatment system according to claim 13 wherein a ratio of a length of the elongated container to a width of the elongated container is in a range of between 3:1 and 8:1.

19. The water treatment system according to claim 13 further comprising:
a filtration member for removing impurities from water released through the discharge port, the filtration member comprising:
an inlet nozzle configured to sealingly couple with the discharge port;
a filter case for maintaining a filter element in communication with water released through the discharge port;
an outlet nozzle configured to sealingly couple at an end of a treated water supply conduit; and,
the filter element for removing impurities from water flowing therethrough.

20. The water treatment system according to claim 19 wherein the filtration member is disposed intermediate with the elongated container and an end of the treated water supply conduit.

21. The water treatment system according to claim 19 wherein the elongated container further comprises a receptacle for maintaining the filtration member in juxtaposition with the discharge port.

22. A method for purifying water in a field environment using the water treatment system according to claim 1 or 13 comprising:
filling an elongated container with the predetermined volume of water, the elongated container including:
a first wall;
a second wall, the first wall and the second wall being constructed from a flexible material; and
at least one flexible, lateral baffle having a first end coupled to an inside surface of the first wall and a second end coupled to an inside surface of the second wall;
adding an effective amount of the water treatment agent for the predetermined volume of water to be treated; sealing the elongated container with the sealing member;
agitating the predetermined volume of water maintained within the internal storage volume for thoroughly mixing the water treatment agent with the predetermined volume of water;

allowing a sufficient amount of time for sediment to settle to the second end of the elongated container; placing the elongated container in an upright orientation; and, dispensing the treated water from the elongated container with the discharge port.

23. The method of purifying water in a field environment according to claim 22 wherein the agitating includes one of;

longitudinally rocking the elongated container back and forth a sufficient amount to effectively mix the water treatment agent with the predetermined volume of water maintained within the internal storage volume;

axially rotating the elongated container a sufficient amount to effectively mix the water treatment agent with predetermined volume of water maintained within the internal storage volume; and, any combination thereof.

* * * * *